US007713610B2

(12) United States Patent
Kanemitsu et al.

(10) Patent No.: US 7,713,610 B2

(45) Date of Patent: May 11, 2010

(54) SLIDING MEMBER

(75) Inventors: Hiroshi Kanemitsu, Toyota (JP); Masaharu Hatta, Toyota (JP)

(73) Assignee: Taiho Kogyo Co., Ltd., Toyota-shi (JP)

(*) Notice: Subject to any disclaimer, the term of this patent is extended or adjusted under 35 U.S.C. 154(b) by 9 days.

(21) Appl. No.: 11/631,837

(22) PCT Filed: Aug. 23, 2005

(86) PCT No.: PCT/JP2005/015243

§ 371 (c)(1), (2), (4) Date: Feb. 26, 2008

(87) PCT Pub. No.: WO2006/027948

PCT Pub. Date: Mar. 16, 2006

(65) Prior Publication Data

US 2008/0248249 A1 Oct. 9, 2008

(30) Foreign Application Priority Data

Sep. 3, 2004 (JP) ............................ 2004-257058

(51) Int. Cl.

*B32B 3/00* (2006.01)
*B32B 3/28* (2006.01)
*B32B 3/30* (2006.01)
*F01B 3/00* (2006.01)

(52) U.S. Cl. ............................ 428/156; 428/167; 92/71

(58) Field of Classification Search ................. 428/156, 428/167; 92/71

See application file for complete search history.

(56) References Cited

U.S. PATENT DOCUMENTS 4,683,804 A * 8/1987 Futamura et al. ............... 92/71
6,477,938 B1 * 11/2002 Nakayama et al. ............. 92/71
2003/0111511 A1 * 6/2003 Kanayama et al. .......... 228/101

FOREIGN PATENT DOCUMENTS

| | | | |
|---|---|---|---|
| JP | 57-076281 | | 5/1982 |
| JP | 62-133016 | | 6/1987 |
| JP | 01-130074 | | 5/1989 |
| JP | 01-224481 | | 9/1989 |
| JP | 02-173212 | | 7/1990 |
| JP | 03-158415 | | 7/1991 |
| JP | 06081030 | A * | 3/1994 |
| JP | 2001-153039 | | 6/2001 |

* cited by examiner

*Primary Examiner*—David R Sample
*Assistant Examiner*—Catherine Simone
(74) *Attorney, Agent, or Firm*—Flynn, Thiel, Boutell & Tanis, P.C.

(57) ABSTRACT

A sliding member includes convex portions are formed by directly quenching a sliding surface of a sliding member in a line shape or a dot shape, and concave portions are formed in indirectly quenched portions adjacent to the directly quenched portions. An irregular surface is formed on the sliding surface by the directly quenched portions and the indirectly quenched portions. The directly quenched portions are formed in a lattice shape, a parallel straight line shape, a concentric circle shape or a spiral shape. With the irregular surface on the sliding surface by the directly quenched portions and the indirectly quenched portions, the seizure resistance can be improved.

6 Claims, 3 Drawing Sheets

SLIDING MEMBER

FIELD OF THE INVENTION

The present invention relates to a sliding surface of a sliding member such as a semispherical shoe and, more particularly, to a sliding surface of a sliding member in which the seizure resistance is increased by improving the sliding surface thereof.

BACKGROUND OF THE INVENTION

Conventionally, various types of sliding members have been known, and a semispherical shoe used for a swash plate compressor has been known as a sliding member used under severe conditions.

The semispherical shoe has a semispherical surface having a semispherical shape and a smooth end surface. The semispherical surface comes into a slidable contact with a semispherical concave portion of a piston forming the swash plate compressor, and the end surface comes into a slidable contact with a swash plate provided on a rotating shaft. Thus, the semispherical shoe is configured so that the semispherical surface serves as the sliding surface with respect to the piston, and the end surface serves as the sliding surface with respect to the swash plate.

The sliding surface of the semispherical shoe is usually manufactured so as to be smooth with a roughness not higher than the required value disclosed in Japanese Patent Laid-Open No. 2001-153039.

SUMMARY OF THE INVENTION

The semispherical shoe is required to have high seizure resistance in order to supply a sufficient amount of lubricating oil to the end surface that comes into a slidable contact with the swash plate. It is not easy to supply the sufficient lubricating oil to the end surface because the lubricating oil is supplied while it is contained in a refrigerant, making the fluctuations in a pressing force to the swash plate caused by the reciprocating motion of a piston more serious. Moreover, the end surface is momentarily brought into a contact with the swash plate under a considerably high pressure.

An object of the present invention is to provide the sliding surface of the sliding member, so that the seizure resistance of the sliding surface of the sliding member such as a semispherical shoe that needs to have high seizure resistance is further improved.

The sliding member includes convex portions formed by directly quenching the sliding surface of the sliding member in a line shape or a dot shape, and concave portions formed in indirectly quenched portions adjacent to the directly quenched portions. An irregular surface is formed on the sliding surface by the directly quenched portions and the indirectly quenched portions.

Since the irregular surface is formed on the sliding surface of the sliding member by the directly quenched portions and the indirectly quenched portions, high seizure resistance can be ensured as compared with the conventional sliding surface of the sliding member having no irregular surface.

DETAILED DESCRIPTION

The present invention will be explained with reference to embodiments shown in the accompanying drawings.

Figure 1:
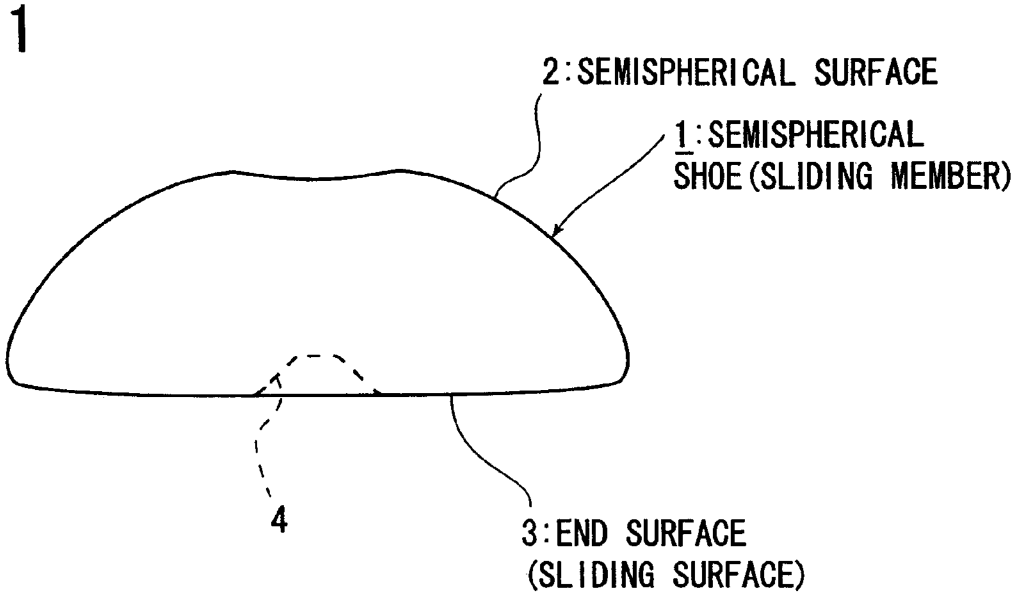
FIG. 1 is a front view showing a first embodiment of the present invention.

In FIG. 1, a semispherical shoe 1 serving as a sliding member is used for a conventionally well-known swash plate compressor, and is interposed between a swash plate provided tiltingly on a rotating shaft and a semispherical concave portion provided in a piston so that the piston can be reciprocatingly driven with the rotation of the swash plate.

The semispherical shoe 1 has a semispherical surface 2 having a semispherical shape and a smooth end surface 3, and is configured so that the semispherical surface 2 is in a slidable contact with the semispherical concave portion in the piston, and the end surface 3 is in a slidable contact with the swash plate. Also, in the central portion of the end surface 3, an oil reservoir 4 consisting of a concave portion is formed.

Figure 2:
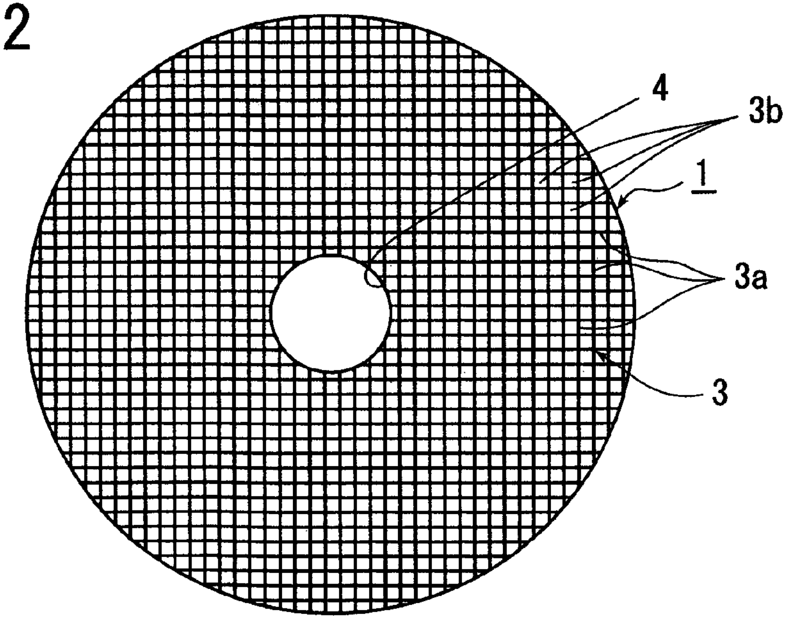
FIG. 2 is a bottom view of FIG. 1.

In an example shown in FIG. 2, lattice-shaped convex portions **3*a* are formed on the end surface 3, and portions other than the convex portions 3*a* relatively become concave portions 3*b*, by which an irregular surface is formed on the end surface 3**.

Figure 3:
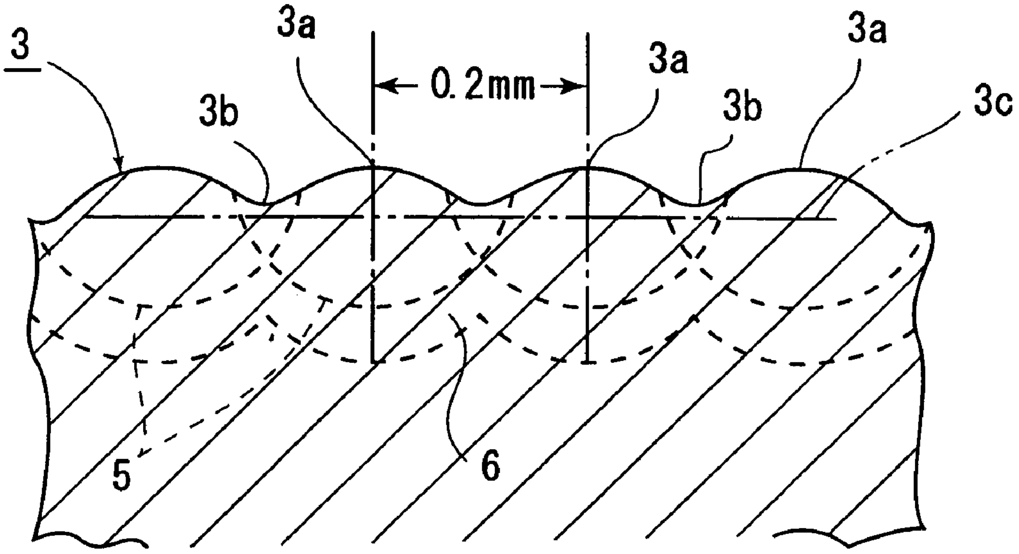
FIG. 3 is an enlarged sectional view of an essential portion, showing in an exaggerated way.

The convex portions **3*a* are formed by directly quenching the end surface 3 after the irradiation of a laser. Specifically, as shown in FIG. 3, in the portions irradiated with the laser, a base material surface 3*c* originally forming the surface of the end surface 3 becomes in a directly quenched state and expands from the base material surface, by which the convex portions 3*a*** are formed.

Although the portions irradiated with the laser become in a directly quenched state, the concave portions **3*b* that are located adjacent to the portions irradiated with the laser and are not irradiated with the laser are not quenched directly, and become indirectly quenched portions. These indirectly quenched portions are recessed relative to the convex portions 3*a*, and therefore the concave portions 3*b*** are formed.

However, this does not mean that the concave portions **3*b*, which are the indirectly quenched portions, are not quenched completely. Specifically, since the range quenched by the laser irradiation has a semicircular shape in the cross section with the laser irradiation position being the center, for example, as indicated by an imaginary line 5 in FIG. 3, by narrowing the adjacent laser irradiation intervals, the concave portions 3*b*, which are the indirectly quenched portions at intermediate positions of the intervals, can also be quenched. Whether the concave portions 3*b*, which are the indirectly quenched portions, are quenched or not can be determined by the setting of the laser irradiation intervals. If the concave portions 3*b*, which are the indirectly quenched portions, are quenched, those portions expand from the base material surface 3*c* though not expanding so much as the convex portions 3*a*** expand.

The experimental result of the seizure resistance will be explained.

In this experiment, a YAG laser is applied to the end surface 3 of the semispherical shoe 1 manufactured of SUJ2 straightly and in parallel at intervals of 0.2 mm, and then is applied in the perpendicular direction in parallel at intervals of 0.2 mm. As a whole, the YAG laser is applied in the lattice form. The interval is preferably in the range of 0.1 to 0.3 mm.

The output of the YAG laser is 50 W, and the condenser lens is adjusted so that the YAG laser is in focus at a position of 2 mm depth with respect to the surface of the end surface 3. Therefore, the YAG laser is applied to the surface of the end surface 3 in a defocused state.

The surface of the convex portion 3*a*, which is the directly quenched portion irradiated with the laser, has a hardness about Hv100 higher than the hardness of the base material, which is Hv750, and also the surface of the concave portion 3*b* has a hardness increased by about Hv50. On the other hand, a portion 6 (refer to FIG. 3) slightly deeper than the directly quenched portion is quenched so that the hardness thereof is about Hv100 lower than the hardness of the base material. Also, an intersection of the two convex portions 3*a*, which are directly quenched portions, namely, a portion in which the laser irradiation portions intersect, is also quenched so that the hardness thereof is likewise about Hv100 lower than the hardness of the base material. However, since the quenching with the laser involves rapid cooling, the decrease in the hardness of the base material is not recognized at a position still deeper than the slightly deep portion 6.

After being irradiated with the laser as described above, the end surface 3 of the semispherical shoe 1 is completed by being subjected to lapping and buffing in succession. The height of the convex portion 3*a* with respect to the concave portion 3*b* is about 0.1 to 10 μm immediately after the laser treatment, and the height thereof of the completed product after the lapping and buffing is preferably in the range of 0.1 to 1 μm.

The wear resistance is measured under the following test conditions on the invented product manufactured as described above and the reference product subjected to lapping and buffing under the same conditions without being irradiated with the laser. For the reference product, the whole semispherical shoe is quenched, and the hardness thereof is Hv750.

Rotational speed of the swash plate: increased in nine steps every one minute by 1000 rpm: the maximum rotational speed 9000 rpm (circumferential speed 38 m/s)

Surface pressure: increased every one minute by 2.7 MPa from a preload of 2.7 MPa: up to seizure Quantity of oil mist: 0.05 to 0.25 g/min nozzle position fixed Oil: refrigerating machine oil Seizure condition: shaft torque 4.0 N·m over The rotational speed of the swash plate is increased under the above-described condition in the state in which the end surface of the invented product is brought into a contact with the swash plate under pressure. On the other hand, the surface pressure at the time when the invented product is brought into a contact with the swash plate under pressure is increased under the above-described condition. When the shaft torque applied to the swash plate exceeds 4.0 N·m, it is determined that the seizure occurs. The same test is also conducted on the reference product.

Figure 4:
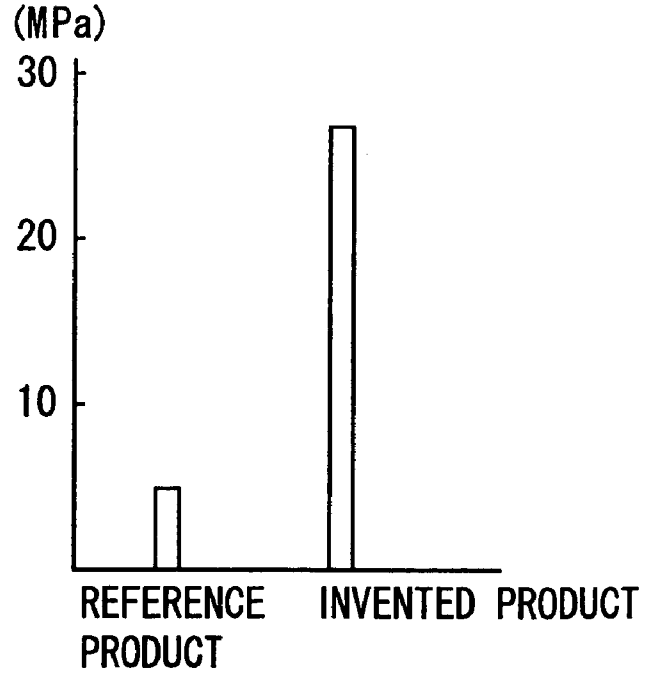
FIG. 4 is a graph showing the experimental result of seizure resistance.

As seen from the experimental result shown in FIG. 4, the invented product provides significantly high seizure resistance as compared with the reference product.

Figure 5:
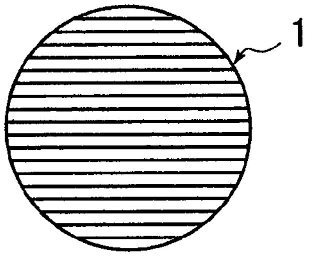
FIG. 5 is a bottom view showing a second embodiment of the present invention.

FIGS. 5 to 8 show other embodiments of the present invention. In FIG. 5, the convex portions 3*a* are formed by forming the directly quenched portions in a parallel straight line shape, and the concave portions 3*b* are formed in the indirectly quenched portions adjacent to the directly quenched portions, by which the irregular surface is formed on the sliding surface by the directly quenched portions and the indirectly quenched portions.

Figure 6:
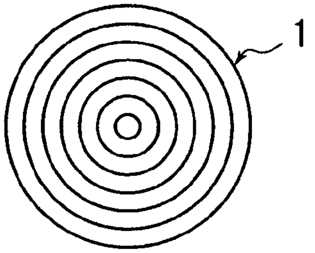
FIG. 6 is a bottom view showing a third embodiment of the present invention.
Figure 7:
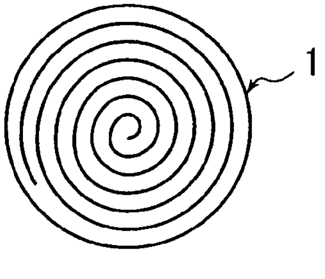
FIG. 7 is a bottom view showing a fourth embodiment of the present invention.
Figure 8:
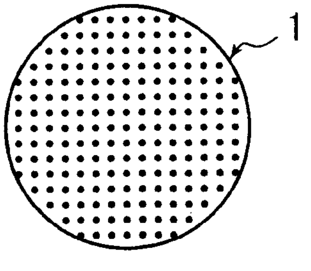
FIG. 8 is a bottom view showing a fifth embodiment of the present invention.

Also, in FIG. 6, the convex portions 3*a* are formed in a concentric circle shape. In FIG. 7, the convex portions 3*a* are formed in a spiral shape. Further, in FIG. 8, dot-shaped convex portions 3*a* are formed on the sliding surface by applying the laser to the intersection of a lattice shape.

In the above-described examples, the semispherical shoe 1 is used as the sliding member. However, the sliding member is not limited to the above-described examples, and needless to say, the present invention can be applied to various sliding surfaces.

Also, in the above-described examples, the convex portions are formed by directly quenching the sliding surface by the laser. However, the quenching method is not limited to the laser, and a plasma beam or other methods can be used.

The invention claimed is:

1. A sliding member comprising:

convex portions having a first hardness formed by directly quenched portions of a surface of a base material which is a sliding surface of the sliding member in a line shape or a dot shape;

concave portions having a second hardness which is less than the first hardness formed in indirectly quenched portions adjacent to the directly quenched portions;

an irregular surface formed on the sliding surface by the directly quenched portions and the indirectly quenched portions; and portions having a third hardness which is less than the second hardness formed between the sliding surface and the base material in a depth direction of the sliding member, wherein the entire surface of the sliding surface has been quenched as a result of quenching the concave portions, making the entire surface of the sliding surface harder than the base material, and the base material is harder than the portions having the third hardness.

2. The sliding member according to claim 1, wherein the sliding member is a semispherical shoe, and the sliding surface is an end surface of the semispherical shoe.

3. The sliding member according to claim 1, wherein the sliding surface is directly quenched at portions irradiated with a laser and the convex portions are formed by the irradiated portions.

4. The sliding member according to claim 1, wherein the height of the convex portion on the irregular surface is in a range of 0.1 to 10 μm.

5. The sliding member according to claim 1, wherein the interval of the adjacent convex portions on the irregular surface is in a range of 0.1 to 0.3 mm.

6. The sliding member according to claim 1, wherein the directly quenched portions are formed in a lattice shape, a parallel straight line shape, a concentric circle shape or a spiral shape.

* * * * *